F. MEATTAUER.
AUTOMOBILE FENDER.
APPLICATION FILED AUG. 11, 1909.
963,306.
Patented July 5, 1910.
2 SHEETS—SHEET 2.
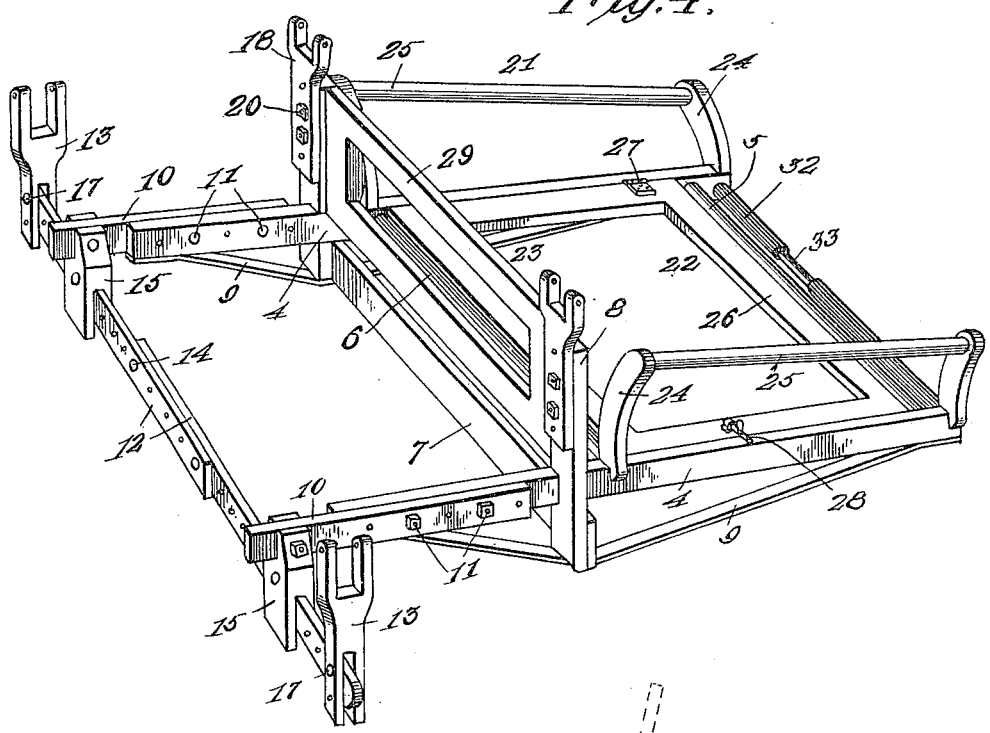
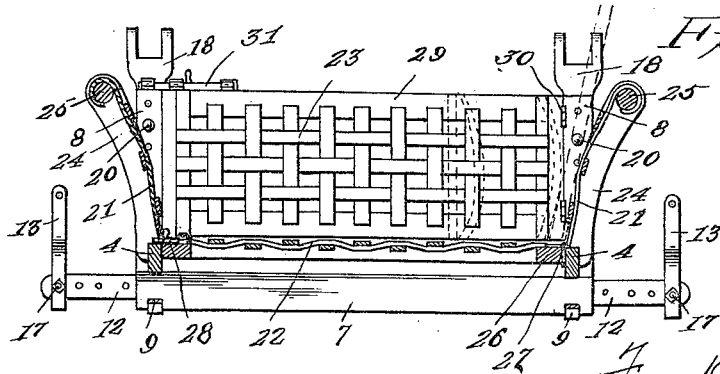

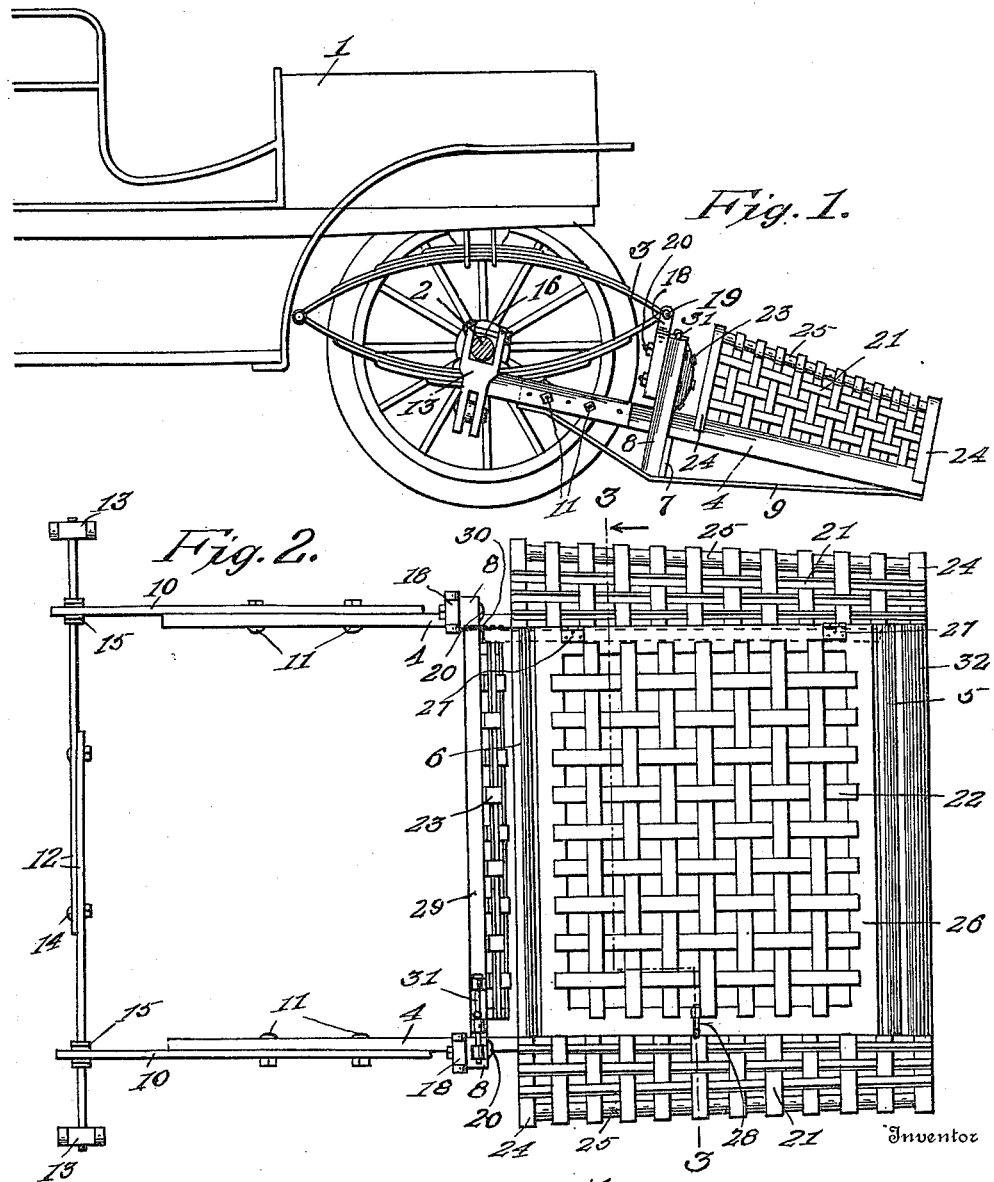

UNITED STATES PATENT OFFICE.

FRANK MEATTAUER, OF LOS ANGELES, CALIFORNIA, ASSIGNOR OF ONE-HALF TO WILLIAM SLAYTON, OF LOS ANGELES, CALIFORNIA.

AUTOMOBILE-FENDER.

963,306. Specification of Letters Patent. Patented July 5, 1910.

Application filed August 11, 1909. Serial No. 512,370.

*To all whom it may concern:*

Be it known that I, FRANK MEATTAUER, a citizen of the United States, residing at Los Angeles, in the county of Los Angeles and State of California, have invented certain new and useful Improvements in Automobile-Fenders, of which the following is a specification, reference being had to the accompanying drawings.

This invention relates to improvements in fenders more particularly designed for use on automobiles but which may be applied to street cars and the like.

The object of the invention is to provide a simple, practical and inexpensive device of this character which is adjustable so that it can be applied to different sizes and makes of automobiles and motor vehicles, and which is so constructed that the cranking device for the engine at the front of the automobile may be readily reached when that is necessary.

With the above and other objects in view, the invention consists of the novel features of construction and the combination and arrangement of parts hereinafter fully described and claimed, and illustrated in the accompanying drawings, in which—

Figure 1 is a side elevation of the invention showing it applied to an automobile, the wheel on the near side of the latter being removed and the axle being in section; Fig. 2 is a top plan view of the fender; Fig. 3 is a cross sectional view taken on the plane indicated by the line 3—3 in Fig. 2; and Fig. 4 is a perspective view of the framework of the fender.

In the drawings 1 denotes a portion of an automobile or other motor vehicle, 2 the front axle of the same and 3 one of the front supporting springs.

The embodiment of the invention illustrated is supported from the axle 2 and springs 3 of the automobile and it comprises a main frame consisting of two side bars 4 united by front and intermediate cross bars or rods 5, 6 and an intermediate cross bar 7, which latter is secured to the lower ends of uprights 8 in turn secured to the intermediate portions of the bars 4. The uprights 8 are braced by truss bars 9, which latter have their intermediate portions secured to the lower ends of the posts 8, and their end portions secured to the bars 4 adjacent the extremities of the latter.

The rear portions of the side bars 4 are adapted to be connected to the axle 2, and to permit the device to be applied to different sized machines, said bars 4 are preferably made longitudinally adjustable by providing on their rear portions extensible sections 10. The extension bars 10 and the rear ends of the side bars 4 are formed with longitudinal series of openings which when in register receive bolts or similar fastenings 11. The extension bars 10 are united by a rear cross bar 12 carrying axle engaging members or brackets 13. The rear cross bar 12 is preferably longitudinally adjustable or extensible by making it in two sections and providing the inner overlapping ends of the same with longitudinal openings adapted to receive bolts or similar fastenings 14. The two sections of the extensible cross bar 12 are secured in the bifurcated lower ends of connecting blocks 15, the bifurcated upper ends of which have secured in them the rear ends of the extension bars 10. The members or brackets 13 have forked upper ends to receive the axle 2 and are retained thereon by bolts or the like 16 in said forked ends, as shown in Fig. 1; and the lower ends of said brackets 13 are forked or bifurcated to receive the ends of the sections of the bar 12, said lower ends being longitudinally adjustable on said bar sections by means of bolts 17 each arranged in one of a longitudinal series of apertures in the ends of said bar sections. Owing to this construction, it will be seen that the rear part of the fender frame may be adjusted for application to various makes and sizes of automobiles.

Upon the upper portions of the uprights 8 are spring engaging members or brackets 18 the upper ends of which are forked and apertured to receive the fastening pins or bolts 19 at the front ends of the springs 3. Said members or brackets 18 are preferably vertically adjustable on the uprights 8 so that the front portion of the frame may be raised or lowered and supported at any desired distance from the ground. This adjustment of the brackets 18 is preferably effected by forming them with a longitudinal series of apertures or openings for the reception of fastening bolts 20. The body or basket portion of the fender which is supported on the front part of the main frame consists of two rigid side sections 21, a movable bottom section 22 and a movable back section 23. Each of the rigid side sections consists of a frame including uprights 24 rising from the side bars 4 and connected by cross bars 25, such frame being covered by any cushioning means or devices. As illustrated, such cushioning means consists of interwoven slats of resilient metal.

The bottom section 22 preferably comprises a rectangular frame 26 to enter between the side bars 4 and the cross rods 5, 6 and hinged at 27 to one of said side bars so that it can be swung upwardly out of the way to the dotted line position shown in Fig. 3. The frame 26 is preferably covered by interwoven resilient metal slats but it may be otherwise covered by cushioning means of any kind. A fastening device 28 preferably in the form of a sliding bolt is provided on the free edge of the bottom section 22 for supporting the latter in its normal lowered position.

The back section 23 comprises a rectangular frame 29 similar to the bottom frame 26 and it is preferably hinged at 30 to one of the uprights 8 so that it can be swung forwardly to one side, as indicated in dotted lines in Fig. 2. A bolt or other fastening device 31 is provided on the upper edge of the free end of the section 23 for fastening it in its normal position.

By making the bottom section so that it can be swung upwardly and the back section so that it can be swung forwardly to one side, it will be seen that the engine cranking device which is usually at the front end of the automobile, may be readily reached for the purpose of cranking up the engine.

Arranged at the front of the main frame between the side bars 4 is a cushioning member 32 in the form of a tubular element made of rubber or other cushioning material and resembling a piece of rubber tubing and arranged on a cross bar or rod 33.

While I have shown and described in detail the preferred embodiment of the invention, it will be understood that I do not wish to limit myself to the precise construction set forth, since various changes in the form, proportion and arrangements of parts and in the details of construction may be resorted to within the spirit and scope of the invention.

Having thus described the invention what is claimed is:

1. A fender of the character described comprising a main frame having attaching means for rigidly securing it to a vehicle, a basket-like body on the front portion of the main frame and including a back section and a bottom section, means for mounting the bottom section to permit it to be swung out of the frame without disturbing the latter, and means for mounting the back section to permit it to be moved to expose the front part of the vehicle without disturbing said frame.

2. A fender of the character described comprising a frame, attaching means on the frame, and a basket-like body at the front end of the frame and having an upwardly swinging bottom section hinged to one side of the frame and a forwardly and horizontally swinging back section hinged to one side of the frame.

3. A fender of the character described comprising a main frame having attaching means, a basket-like body upon the front portion of the frame and including rigid side sections, a bottom section and a back section, hinges uniting said bottom section to one side of the frame, a fastening for the free edge of said bottom section, hinges uniting the back section to an upright post on the frame and a fastening for the free end of said back section.

4. A fender of the character described comprising a main frame having longitudinally extensible side bars, means uniting said side bars, uprights upon said frame, attaching means upon said uprights, a longitudinally extensible connecting bar uniting the rear portions of said side bars, attaching means upon said connecting bar, and a body at the front end of the frame and provided with an upwardly swinging bottom section and a forwardly swinging back section.

5. A fender of the character described comprising a main frame having longitudinally extensible side bars, means uniting said side bars, uprights upon said frame, vertically adjustable attaching brackets upon said uprights, a longitudinally extensible connecting bar uniting the rear ends of said side bars, horizontally adjustable attaching brackets upon the ends of said connecting bar, and a body upon the front portion of the frame and having an upwardly swinging bottom section and a forwardly swinging back section.

6. A fender of the character described comprising a main frame having side bars, uprights upon the intermediate portions of the latter, a cross bar uniting the lower ends of said uprights, truss bars uniting the side bars and the lower ends of the uprights, attaching brackets upon the upper ends of the uprights, a transverse connecting bar uniting the rear portions of the side bars, attaching brackets upon said connecting bar, and a body upon the front portion of the main frame and having an upwardly swinging bottom section and a forwardly swinging back section.

7. A fender of the character described comprising a main frame having connected side bars and uprights, attaching means upon said uprights, attaching means carried by the rear portions of said side bars and a body at the front end of the frame.

8. A fender of the character described comprising a main frame having longitudinally extensible side bars, means uniting said side bars, attaching means at the rear ends of said side bars, uprights upon the intermediate portion of the side bars, attaching means upon said uprights, and a body at the front of the frame.

9. A fender of the character described comprising a main frame having connected side bars and uprights, attaching means upon said uprights, a longitudinally extensible connecting bar at the rear ends of said side bars, attaching means on said connecting bars, and a body at the front end of said frame.

10. A fender of the character described comprising a main frame having connected side bars and uprights, a rear connecting bar uniting said side bars, attaching brackets longitudinally adjustable on said rear connecting bar, attaching means on said uprights and a body at the front of the frame.

11. A fender of the character described comprising a main frame having connected side bars and uprights, attaching means at the rear of said side bars, vertically adjustable attaching brackets on said uprights and a body at the front of the frame.

In testimony whereof I hereunto affix my signature in the presence of two witnesses.

FRANK MEATTAUER.

Witnesses:
  E. E. BACON,
  A. L. GRIBLING.